US010367609B2

(12) United States Patent
Linsky et al.

(10) Patent No.: US 10,367,609 B2
(45) Date of Patent: Jul. 30, 2019

(54) ERROR CORRECTION FOR DATA PACKETS TRANSMITTED USING AN ASYNCHRONOUS CONNECTION-LESS COMMUNICATION LINK

(71) Applicant: QUALCOMM Incorporated, San Diego, CA (US)

(72) Inventors: Joel Linsky, San Diego, CA (US); Robin Heydon, Cambridge (GB); Brian Redding, Urbana, IL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/710,085

(22) Filed: Sep. 20, 2017

(65) Prior Publication Data

US 2019/0089490 A1    Mar. 21, 2019

(51) Int. Cl.
*H04L 1/18* (2006.01)
*H04L 1/00* (2006.01)
*H04W 28/06* (2009.01)
*H04L 1/08* (2006.01)
*H04W 84/18* (2009.01)
*H04L 1/16* (2006.01)
*H04L 1/12* (2006.01)

(52) U.S. Cl.
CPC .......... *H04L 1/1809* (2013.01); *H04L 1/0061* (2013.01); *H04L 1/08* (2013.01); *H04L 1/189* (2013.01); *H04L 1/1845* (2013.01); *H04L 1/1854* (2013.01); *H04W 28/065* (2013.01); *H04L 1/16* (2013.01); *H04L 2001/125* (2013.01); *H04W 84/18* (2013.01)

(58) Field of Classification Search
CPC ..................................................... H04L 1/1819
USPC ........................................ 714/751, 748, 752
See application file for complete search history.

(56) References Cited

U.S. PATENT DOCUMENTS

| 8,392,810 B2 | 3/2013 | Linskey et al. |
| 9,196,256 B2 | 11/2015 | Su et al. |
| 9,318,116 B2 | 4/2016 | Mangold |
| 9,483,345 B2 | 11/2016 | Achir et al. |
| 2006/0045005 A1* | 3/2006 | Blackmore ........... H04L 1/0079 370/216 |

(Continued)

*Primary Examiner* — Fritz Alphonse
(74) *Attorney, Agent, or Firm* — Arent Fox, LLP and Qualcomm, Incorporated

(57) ABSTRACT

As many applications, such as wireless headsets used with cellular phones, require mostly error free data to accurately reproduce a telephone conversation, uncorrected erroneous data packets may impact a perceived quality of a given application. The error correction techniques of the present disclosure promote error-correction in communication systems that lack FEC with respect to one or more portions of a data packet. The techniques therefore provide error correction for the entire packet, including those portions not protected by any imbedded error correction mechanism. As a result, data communications over noisy communication mediums may be improved as the techniques may reduce bit error rates, and increase the sensitivity of the receiving device such that the transmission power of a data packet may be reduced. For voice packets or other streaming data packets, the techniques promote improved audio quality over systems that do not employ the techniques described in the present disclosure.

24 Claims, 11 Drawing Sheets

(56) References Cited

U.S. PATENT DOCUMENTS

| | | | |
|---|---|---|---|
| 2006/0045099 A1* | 3/2006 | Chang | H04L 69/16 370/400 |
| 2006/0059282 A1* | 3/2006 | Chaudhary | H04L 67/1097 710/100 |
| 2006/0075067 A1* | 4/2006 | Blackmore | H04L 69/16 709/217 |
| 2016/0365948 A1 | 12/2016 | Kalle | |

* cited by examiner

ERROR CORRECTION FOR DATA PACKETS TRANSMITTED USING AN ASYNCHRONOUS CONNECTION-LESS COMMUNICATION LINK

BACKGROUND

Field

The present disclosure relates generally to communication systems, and more particularly, to error correction of data packets that are received via an asynchronous connection-less (ACL) communication link.

Background

A wireless personal area network (WPAN) is a personal, short-range area wireless network for interconnecting devices centered around a specific distance from a user. WPANs have gained popularity because of the flexibility and convenience in connectivity that WPANs provide. WPANs, such as those based on short-range communication protocols (e.g., a Bluetooth® (BT) protocol, Bluetooth® low energy (BLE) protocol, a Zigbee® protocol, etc.), provide wireless connectivity to peripheral devices by providing short-range wireless links that allow connectivity within a specific distance (e.g., 5 meters, 10 meter, 20 meters, 100 meters, etc.).

BT is a short-range wireless communication protocol that supports a WPAN between a central device (e.g., a master device) and at least one peripheral device (e.g., a slave device). Power consumption associated with BT communications may render BT impractical in certain applications.

To address the power consumption issue associated with BT, BLE was developed and adopted in various applications. BLE uses a low duty cycle operation (as compared with BT), and switches at least one of the central device and/or peripheral device(s) to a sleep mode in between data transmissions. Example applications that use BLE include battery-operated sensors and actuators in various medical, industrial, consumer, and fitness applications that connect to devices such as BLE enabled smart phones, tablets, and laptops. While traditional BLE offers certain advantages, BLE may not be able to perform forward error correction (FEC) to correct erroneous data packets received by a receiving device. As many applications, such as wireless headsets used with cellular phones, require mostly error free data to accurately reproduce a telephone conversation, uncorrected erroneous data packets may substantially impact a perceived quality of a given application.

There exists a need to an error correction technique for BLE communications that increases, e.g., the output quality for voice or other data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. Example applications that use BLE include battery-operated sensors and actuators in various medical, industrial, consumer, and fitness applications. The BLE applications often connect to devices such as BLE enabled smart phones, tablets, and laptops.

While traditional BLE offers certain advantages, the traditional BLE protocol provides only for error detection in the payload of a data packet through the use of a cyclic redundancy check (CRC). Thus, according to the traditional BLE protocol, retransmission is the means by which errors in the payload may be "corrected," where correction via retransmission is different than the dynamic correction of the same data packet enabled through FEC. That is, FEC actually corrects the errors in the same data packet, while the retransmission corrects the errors of the current data packet by replacing the current data packet with another version of the data payload, which may or may not include errors.

Failing error correction in the traditional BLE protocol, an erroneous data packet may be replaced with a special packet that in effect defines silence or packet loss concealment. The silence packet and/or packet loss concealment may reduce communication quality because portions of the communication may be omitted (e.g., voice breaks during a voice call).

As many applications, such as wireless headsets used with cellular phones, require mostly error free (e.g., low error rate data streams) data to accurately reproduce a telephone conversation, uncorrected erroneous data packets may impact a perceived quality of a given application.

In addition, using the error correction techniques of traditional BLE may not only reduce the perceived audio quality of a given application, but may also limit a transmit power reduction of a BLE air interface packet due to a limited sensitivity at the receiving device. The receiving device sensitivity may be correlated with the lowest signal power level from which the receiving device may obtain information from a BLE air interface packet without meeting a Bit Error Rate (BER) threshold. Hence, the receiving device sensitivity may limit the transmit power reduction for a BLE air interface packet.

There exists a need for a BLE error correction technique in order to improve, e.g., to increase audio quality for voice or other streaming audio data without using a silence packet and/or a packet loss concealment, and to increase the sensitivity of the receiving device.

The error correction techniques of the present disclosure promote error-correction in communication systems that lack FEC or other embedded error correction mechanisms with respect to one or more portions of a data packet by maintaining multiple data packet retransmissions, applying a packet header mask, and performing a majority-vote to correct for errors in at least the header and the payload. The techniques therefore provide error correction for the entire packet, including packet portions not protected by any imbedded error correction mechanism. As a result, data communications over noisy communication mediums may be improved as the techniques may reduce bit error rates, and increase the sensitivity of the receiving device such that the transmission power of a data packet may be reduced. For data communications involving voice or other streaming audio data, the techniques promote increased audio quality over systems that do not employ the techniques described in the present disclosure.

In an aspect of the disclosure, a method, a computer-readable medium, and an apparatus are provided. The apparatus may receive a data packet retransmission from a second device when a previous data packet transmission is unacknowledged by the first device. In one aspect, the data packet may include at least a packet header and a payload. The apparatus may maintain each transmission of the data packet up to a threshold number of maintained data packets when the data packet is unacknowledged by the first device. The apparatus may apply a packet header mask to the packet header in each of the maintained data packets when the threshold number of maintained data packets is reached. The apparatus may determine if the packet header in each of the maintained data packets is the same after the packet header mask is applied. The apparatus may determine if a number of differences between payloads in each paired combination of the maintained data packets meets a threshold criteria when it is determined that the packet header in each of the maintained data packets is the same after the packet header mask is applied. The apparatus may perform a bit-wise majority vote on the payload for at least one of the maintained data packets to determine an error-corrected data packet when it is determined that the number of differences between the payloads for each paired combination of the maintained data packets does not meet the threshold criteria. In one aspect, the error-corrected data packet may include a majority-voted payload.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
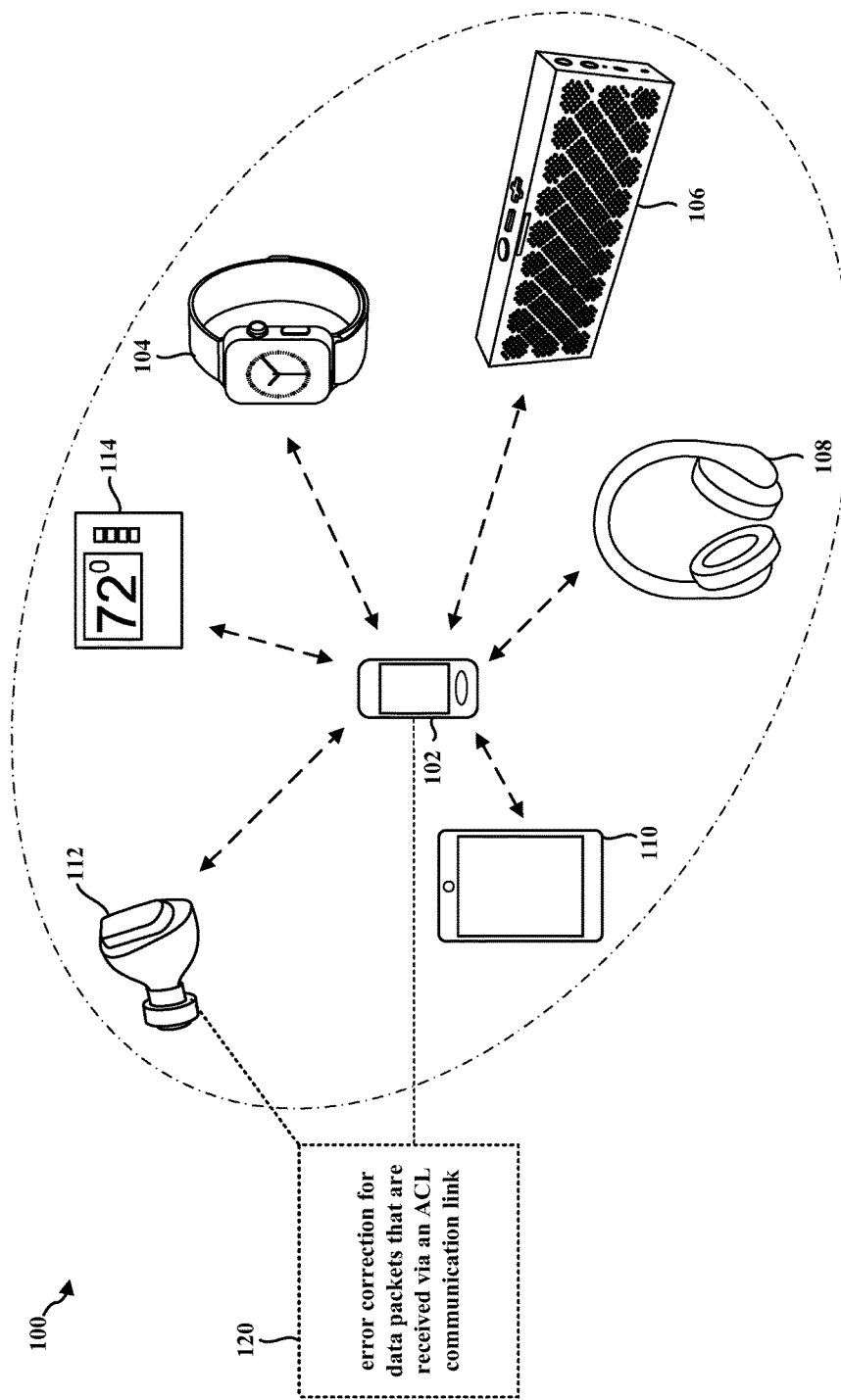
FIG. 1 is a diagram illustrating an example of a WPAN in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a central device 102 may use an ACL communication link 116 to communicate with one or more peripheral devices 104, 106, 108, 110, 112, 114 using a BLE protocol. The BLE protocol is a specification that enables radio frequency communication operating within the globally accepted 2.4 GHz Industrial, Scientific & Medical (ISM) band.

The BLE protocol may implement wireless communication using a specific type of spread spectrum data communication referred to as a "frequency-hopping" spread spectrum. Frequency-hopping spread spectrum may divide a data packet communicated over the wireless communication medium into discrete portions and transmit each of the portions as a signal of up to, e.g., 79 different frequencies. Typically, the BLE protocol provides for ACL communication links, where a first device connects (or "pairs" in the terminology of the "Bluetooth™ specification) with a second device. The connection is asynchronous in that the two devices may not need to synchronize, time-wise, data communications between each other to permit transmission of data packets via the ACL communication link 116.

Due to increasing numbers of wireless devices being used, wireless devices may overrun the frequencies used for the ACL communication link 116. Consequently, these wireless communication channels (e.g., ACL communication link 116) may be "noisy" in the sense that static or other interference may introduce random signals of the same frequency bands as those reserved to communicate over established the ACL communication link 116. Static, interference, and/or random signals may cause errors to a data packet transmitted via the ACL communication link 116. By providing for retransmissions of the original data packet via the ACL communication link 116, the probability of receiving an error-free packet may be increased.

While traditional BLE offers certain advantages, the traditional BLE protocol provides only for error detection in the payload of a data packet through the use of a CRC. Thus, according to the traditional BLE protocol, retransmission is the means by which errors in the payload may be "corrected," where correction via retransmission is different than the dynamic correction of the same data packet enabled through FEC. That is, FEC corrects the errors in the same data packet, while the retransmission corrects the errors of the current data packet by replacing the current data packet with a data packet with another version of the data payload, which may or may not include errors.

Failing error correction in the traditional BLE protocol, an erroneous data packet may be replaced with a special packet that in effect defines a silence packet or a packet loss concealment. The silence packet and/or packet loss concealment may reduce communication quality because portions of the communication may be omitted (e.g., voice breaks during a voice call).

In accordance with one aspect of the techniques of the disclosure, a first device, such as a headset 112, may receive multiple retransmissions of a data packet over an ACL communication link 116 between the headset 112 and a second device, such as a BLE mobile phone 102. The headset 112 therefore may receive an original transmission of the data packet over the ACL communication link 116 and perform error detection to determine whether the data packet includes an error. If the data packet includes an error, the headset 112 may first attempt to correct the error. Assuming, however, that the error cannot be corrected, the headset 112 will not send an acknowledgement packet in response to the first transmission of the data packet to the mobile device 102.

The headset 112 may receive a second transmission of the data packet when the original transmission of the data packet is unacknowledged. The headset 112 may determine whether the second transmission of the data packet includes an error. Assuming the second transmission of the data packet contains an error that cannot be corrected, the headset 112 will not send an acknowledgement packet in response to the second transmission of the data packet to the mobile device 102.

The headset 112 may receive a third transmission of the data packet when the second transmission of the data packet is unacknowledged. The headset 112 may determine whether the third transmission of the data packet contains an error that cannot be corrected.

In accordance with certain aspects of the disclosure, in response to detecting another uncorrectable error in the third transmission of the data packet, the headset 112, rather than replace the third transmission of the data packet with the special communication designating silence or packet loss concealment, may perform a bit-wise majority vote on corresponding payload bits of the first transmission of the data packet, the second transmission of the data packet, and the third transmission of the data packet to generate at least a partially error-corrected communication. The headset 112 may perform the bit-wise majority vote by comparing, for example, the first bit of the payload of each of the first transmission of the data packet, the second transmission of the data packet, and the third transmission of the data packet, which for illustrative purposes may comprise first bit values of 1, 1 and 0, respectively. As the two 1's form a majority, the first device may select "1," thereby implementing a bit-wise majority vote to correct the assumed "0" error in the third transmission of the data packet. The majority-vote process may be performed for each respective bit of the data packet payloads of the first transmission of the data packet, the second transmission of the data packet and the third transmission of the data packet.

Moreover, the error correction techniques described in the present disclosure may also include that the headset 112 may check the header of the data packet for errors since the header lacks a CRC, as well as continually maintaining a certain number of data packet retransmissions by flushing out the data packet retransmission that includes the payload with the most errors. By performing the majority-vote process, checking the header, and continually maintaining retransmitted data packets with the fewest errors by flushing out the data packet retransmission that includes the payload with the most errors, the error correction techniques of the present disclosure may improve the quality of communication over an ACL communication link 116 compared to the quality experienced while using conventional error correction techniques that substitute a special packet designating silence or packet loss concealment for an erroneous data packet.

The central device 102 may include suitable logic, circuitry, interfaces, processors, and/or code that may be used to communicate with one or more peripheral devices 104, 106, 108, 110, 112, 114 using the error correction techniques as described below with reference to FIGS. 2-8. The central device 102 may operate as an initiator to request establishment of a Link Layer (LL) connection (e.g., the ACL communication link 116) with an intended peripheral device 104, 106, 108, 110, 112, 114.

A LL in the BLE protocol stack (e.g., see FIG. 3) provides, as compared to BT, ultra-low power idle mode operation, simple device discovery and reliable point-to-multipoint data transfer with advanced power-save and encryption functionalities. After a requested LL connection is established, the central device 102 may become a master device and the intended peripheral device 104, 106, 108, 110, 112, 114 may become a slave device for the established LL connection, or vice versa. As a master, the central device 102 may be capable of supporting multiple LL connections at a time to various peripheral devices 104, 106, 108, 110, 112, 114 (slave devices). The central device 102 (master) may be operable to manage various aspects of data packet communication in a LL connection with an associated peripheral device 104, 106, 108, 110, 112, 114 (slave). For example, the central device 102 may be operable to determine an operation schedule in the LL connection with a peripheral device 104, 106, 108, 110, 112, 114 (slave). The central device 102 may be operable to initiate a data packet exchange sequence in the LL connection. LL connections may be configured to run periodic connection events in data channels. Data packet transmissions may take place within connection events.

In certain configurations, the central device 102 may be configured to transmit the first data packet in each connection event to an intended peripheral device 104, 106, 108, 110, 112, 114. The central device 102 may utilize a polling scheme to poll the intended peripheral device 104, 106, 108, 110, 112, 114 for a data packet transmission in a connection event. The intended peripheral device 104, 106, 108, 110, 112, 114 may transmit an acknowledgement when a data packet transmitted by the central device 102 is properly received and/or decoded (e.g., the CRC passes).

Examples of the central device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, a thermostat, a hearing aid, a wireless headset, a blood glucose on-body unit, an Internet-of-Things (IoT) device, or any other similarly functioning device.

Examples of the one or more peripheral devices 104, 106, 108, 110, 112, 114 include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device, a vehicle, an electric meter, a gas pump, a toaster, a thermostat, a hearing aid, a wireless headset, a blood glucose on-body unit, an IoT device, or any other similarly functioning device. Although the central device 102 is illustrated in communication with six peripheral devices 104, 106, 108, 110, 112, 114 in the WPAN 100, the central device 102 may communicate with more or fewer than six peripheral devices within the WPAN 100 without departing from the scope of the present disclosure.

Referring again to FIG. 1, in certain aspects, the central device 102 and/or a peripheral device (e.g., peripheral device 112) may be configured to perform error correction for data packets that are received via an ACL communication link (120).

Figure 2:
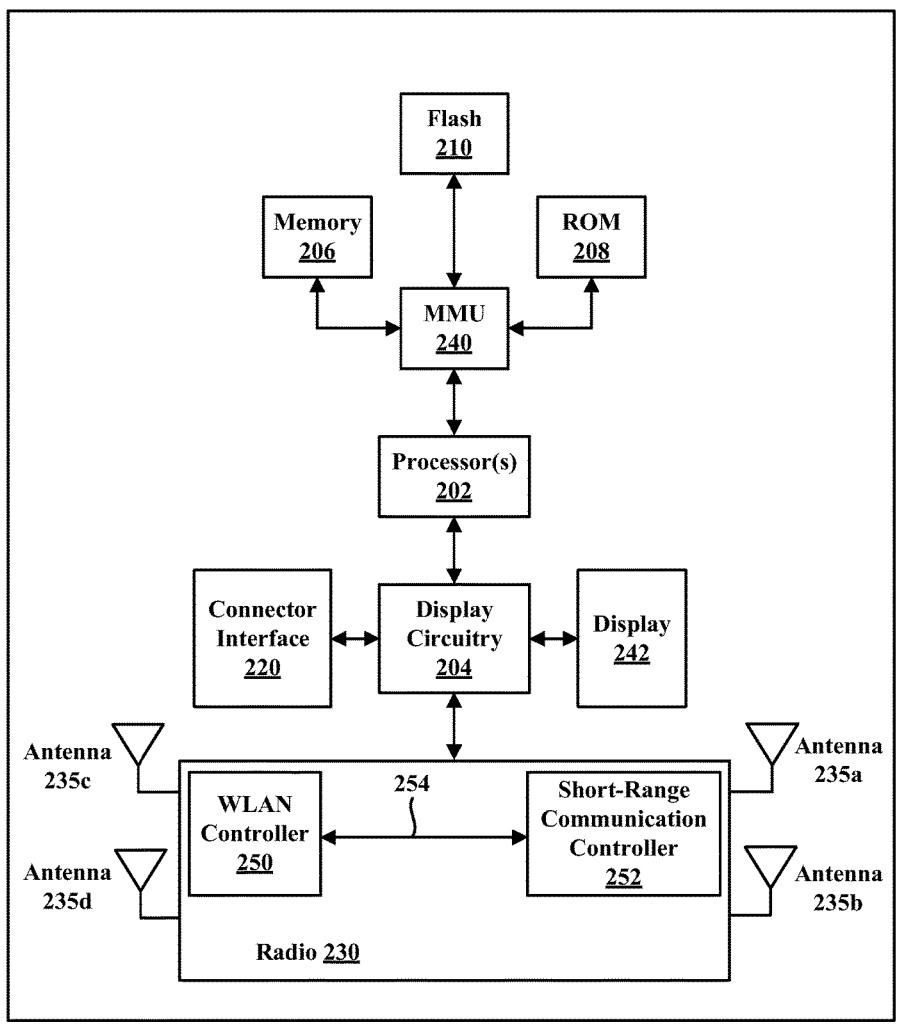
FIG. 2 is block diagram of a BLE device in accordance with certain aspects of the disclosure.

FIG. 2 is block diagram of a wireless device 200 in accordance with certain aspects of the disclosure. The wireless device 200 may correspond to, e.g., the central device 102, and/or one of the peripheral devices 104, 106, 108, 110, 112, 114 in FIG. 1. In certain configurations, the wireless device 200 may be, e.g., a BLE device that is configured to perform error correction for data packets that are received via an ACL communication link.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate those addresses to locations in memory (e.g., memory 206, ROM 208, Flash memory 210) and/or to other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, etc.). The wireless device 200 may include a plurality of antennas 235a, 235b, 235c, 235d, for performing wireless communication with other BLE devices.

In certain aspects, the wireless device 200 may include hardware and software components (a processing element) configured to separately check the header of the data packet for errors and perform majority voting of a data packet, e.g., using the techniques described below with reference to FIGS. 3-8. The wireless device 200 may also include BLE firmware or other hardware/software for controlling BLE operations. In addition, the wireless device 200 may store and execute a WLAN software driver for controlling WLAN operations.

The wireless device 200 may be configured to implement part or all of the error correction techniques described below with reference to FIGS. 3-8, e.g., by executing program instructions stored on a memory medium (e.g., a non-transitory computer-readable memory medium) and/or through hardware or firmware operation. In other embodiments, the error correction techniques described below with reference to FIGS. 3-8 may be at least partially implemented by a programmable hardware element, such as an field programmable gate array (FPGA), and/or as an application specific integrated circuit (ASIC).

In certain aspects, radio 230 may include separate controllers configured to control communications for various respective radio access technology (RAT) protocols. For example, as shown in FIG. 2, radio 230 may include a wireless local area network (WLAN) controller 250 configured to control WLAN communications and a short-range communications controller 252 configured to control short-range communications (e.g., BLE communications). A coexistence interface 254 (e.g., a wired interface) may be used for sending information between the WLAN controller 250 and the short-range communications controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communications controller 252 may be configured to implement a BLE protocol stack (see FIG. 3), and communicate with at least one second device using one or more of the antennas 235a, 235b, 235c, 235d. The short-range communications controller 252 may be configured to separately check the header of the data packet for errors and perform majority voting of a data packet.

Figure 3:
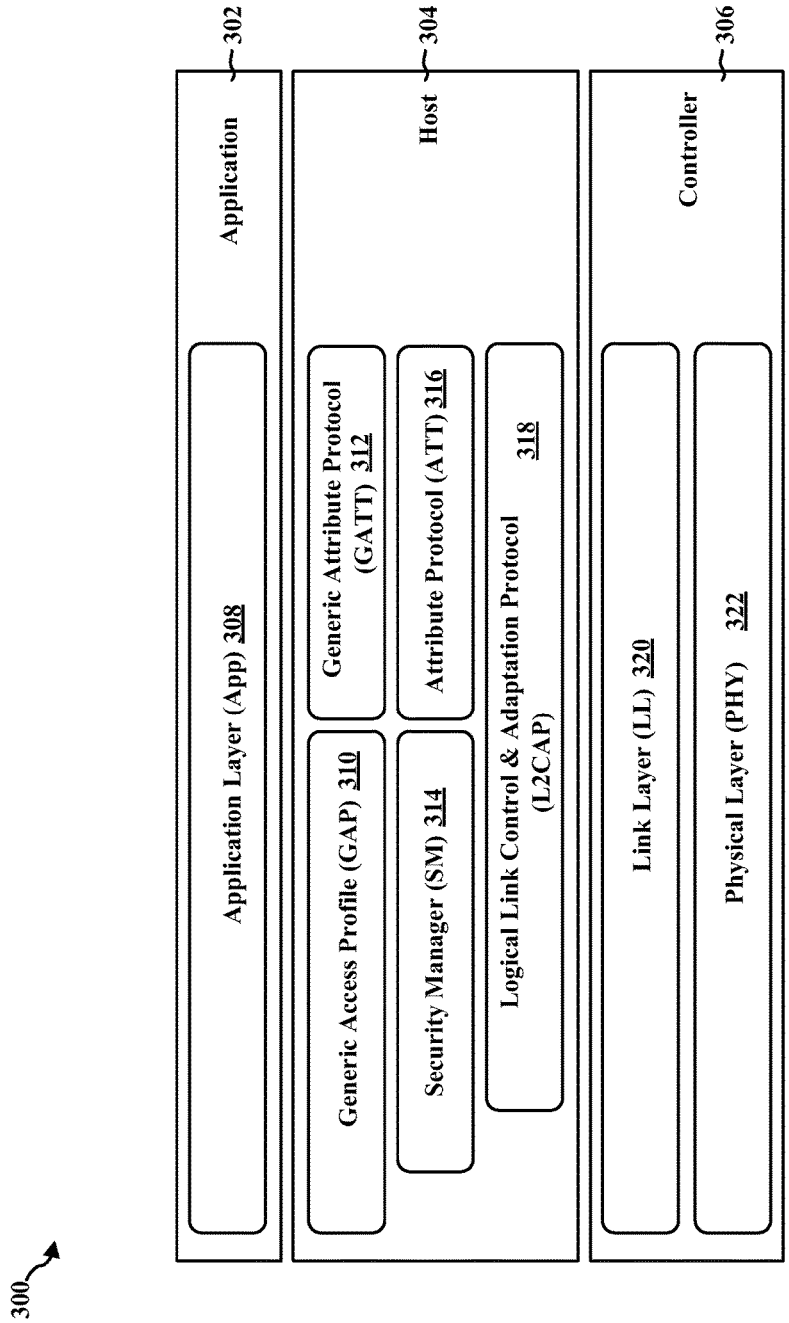
FIG. 3 is a diagram illustrating BLE protocol stack that may be implemented by a BLE device in accordance with certain aspects of the disclosure.

FIG. 3 illustrates a BLE protocol stack 300 that may be implemented in a BLE device. For example, the BLE protocol stack 300 may be implemented by, e.g., one or more of processor(s) 202, memory 206, Flash memory 210, ROM 208, the radio 230, and/or the short-range communications controller 252 illustrated in FIG. 2.

Referring to FIG. 3, the BLE protocol stack 300 is organized into three blocks, namely, the Application 302, the Host 304, and the Controller 306. Application 302 is the user application which interfaces with the other blocks and/or layers of the BLE protocol stack 300. The Host 304 includes the upper layers of the BLE protocol stack 300, and the Controller 306 includes the lower layers of the BLE protocol stack 300.

The Host 304 may communicate with a BLE controller (e.g., short-range communications controller 252 in FIG. 2) in a wireless device using a Host Controller Interface (HCI) (not illustrated in FIG. 3). The HCI may also be used to interface the Controller 306 with the Host 304. Interfacing the Controller 306 and the Host 304 may enable a wide range of Hosts to interface with the Controller 306.

The Application 302 may include a higher-level Application Layer (App) 308, and the BLE protocol stack 300 may run under the App 308. The Host 304 may include a Generic Access Profile (GAP) 310, a Generic Attribute Protocol (GATT) 312, a Security Manager (SM) 314, an Attribute Protocol (ATT) 316, and a Logical Link Control and Adaptation Protocol (L2CAP) 318. The Controller 306 may include a LL 320 and a Physical Layer (PHY) 322.

The PHY 322 may define the mechanism for transmitting a bit stream over a physical link that connects BLE devices. The bit stream may be grouped into code words or symbols, and converted to a data packet that is transmitted over a transmission medium. The PHY 322 may provide an electrical, mechanical, and procedural interface to the transmission medium. The shapes and properties of the electrical connectors, the frequency band used for transmission, the modulation scheme, and similar low-level parameters may be specified by the PHY 322.

The LL 320 is responsible for low level communication over the PHY 322. The LL 320 manages the sequence and timing for transmitting and receiving data packets, and using a LL protocol, communicates with other devices regarding connection parameters and data flow control. The LL 320 also provides gate keeping functionality to limit exposure and data exchange with other devices. If filtering is configured, the LL 320 maintains a list of allowed devices and will ignore all requests for data exchange from devices not on the list. The LL 320 may also reduce power consumption. The LL 320 may use a HCI (not shown in FIG. 3) to communicate with upper layers of the BLE protocol stack 300. The LL 320 may include a company's proprietary LL that may be used to discover peer devices (e.g., other devices associated with the company), and establish a secure communication channel therewith.

In certain aspects, the LL 320 may be responsible for transporting data packets between devices in a WPAN. Each data packet may include a logical transport address LT_ADDR in a header field, which specifies the type of logical transport used to carry the data packet. Logical transports may exist between a master device and slave devices. Additionally, some logical transports may carry multiple logical links.

One type of logical transport is an ACL logical transport. The ACL logical transport may be used to carry data packets such as the data packet described below with reference to FIG. 4. Each device may receive a default ACL logical transport when the device joins the WPAN. Each ACL logical transport may carry one or more ACL communication links, which are distinguished by a Logical Link ID (LLID) field of the header. Retransmitted data packets carried via an ACL communication link may be received automatically if unacknowledged by the receiver device, allowing for correction of a radio link that is subject to interference. The ACL logical transport may permit communication of data for time-sensitive or time-bounded applications, such as streaming services, voice applications including Voice over Internet Protocol (VoIP) and more standard, cellular telephone calls. Failing error correction, an erroneous data packet carried via an ACL communication link may be replaced with a special communication packet that in effect defines silence or packet loss concealment when the traditional BLE protocol is implemented. The special silence communication packet and/or packet loss concealment may reduce the communication quality experienced over ACL communication links because portions of the communications may be omitted (e.g., voice breaks during a voice call).

The error correction techniques described in the present disclosure may include, for example, checking the header of the data packet for errors since the header lacks a CRC, continually maintaining data packet retransmissions by flushing out the data packet that includes the payload with the most errors, and performing a majority vote process to error correct the payload. By checking the header, continually maintaining newly retransmitted data packets by flushing out the data packet that includes the payload with the most errors, and performing the majority-vote process, the error correction techniques of the present disclosure may increase the quality of communication over an ACL communication link compared to the quality experienced while using conventional error correction techniques that substitute a special packet designating silence or packet loss concealment for an erroneous data packet.

The L2CAP 318 may encapsulate multiple protocols from the upper layers into a data packet format (and vice versa). The L2CAP 318 may also break packets with a large data payload from the upper layers into multiple packets with the data payload segmented into smaller size data payloads that fit into a maximum payload size (e.g., 27 bytes) on the transmit side. Similarly, the L2CAP 318 may receive multiple data packets carrying a data payload that has been segmented, and the L2CAP 318 may combine the segmented data payload into a single data packet carrying the data payload that will be sent to the upper layers.

The ATT 316 is a client/server protocol based on attributes associated with a BLE device configured for a particular purpose (e.g., monitoring heart rate, temperature, broadcasting advertisements, etc.). The attributes may be discovered, read, and written by peer devices. The set of operations which are executed over ATT 316 may include, but are not limited to, error handling, server configuration, find information, read operations, write operations, queued writes, etc. The ATT 316 may form the basis of data exchange between BLE devices.

The SM 314 is responsible for device pairing and key distribution. A security manager protocol implemented by the SM 314 may define how communications with the SM of a counterpart BLE device are performed. The SM 314 provides additional cryptographic functions that may be used by other components of the BLE protocol stack 300. The architecture of the SM 314 used in BLE is designed to minimize recourse requirements for peripheral devices by shifting work to an assumingly more powerful central device. BLE uses a pairing mechanism for key distribution. The SM 314 provides a mechanism to not only encrypt the data but also to provide data authentication.

The GATT 312 describes a service framework using the attribute protocol for discovering services, and for reading and writing characteristic values on a peer device. The GATT 312 interfaces with the App 308 through the App's profiles. The App 308 profile defines the collection of attributes and any permission needed for the attributes to be used in BLE communications.

The GAP 310 provides an interface for the App 308 to initiate, establish, and manage connection with other BLE devices.

Figure 4:
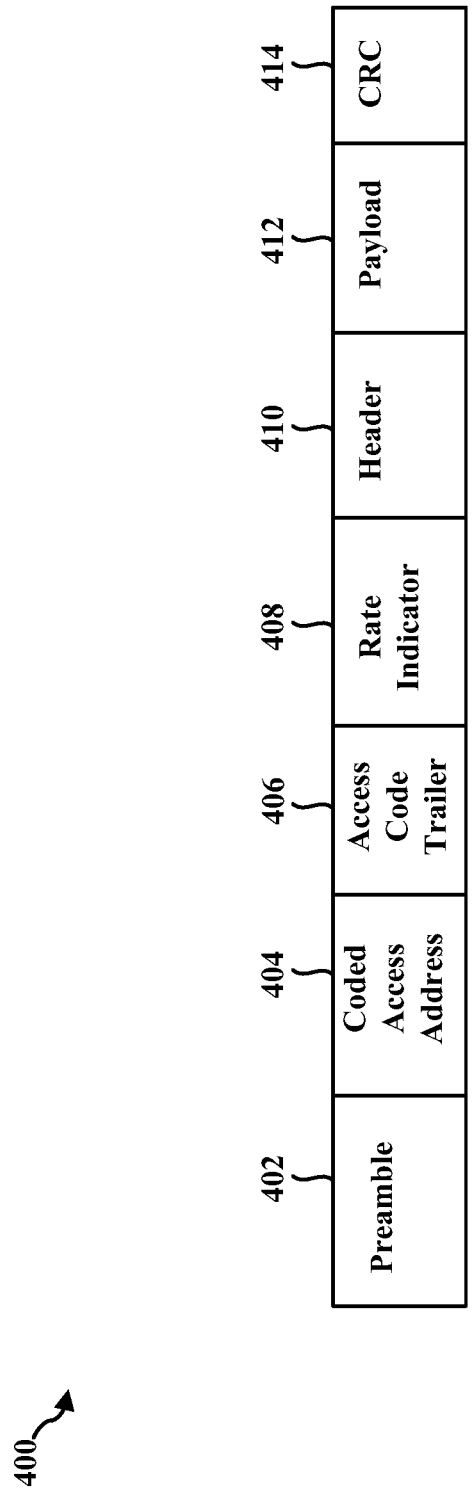
FIG. 4 is a diagram illustrating a BLE data packet in accordance with certain aspects of the disclosure.

FIG. 4 is a diagram illustrating a data packet 400 in accordance with certain aspects of the present disclosure. As seen in FIG. 4, the data packet 400 may include a preamble 402, a coded access address 404, an access code trailer 406, a rate indicator 408, a header 410, a payload 412, and a CRC 414. In certain configurations, the data packet 400 may not include the CRC 414. In certain other configurations, the payload 412 may include a message integrity check (MIC). An MIC includes information that may be used by to authenticate a data packet. In other words, the MIC may be used by the receiving device to confirm that the message came from the stated transmitting device (e.g., data packet authenticity), and to confirm that the payload 412 has not been changed (e.g., data packet integrity). The MIC protects both payload integrity and the authenticity of the data packet 400 by enabling a receiving device who also possess the secret key to detect any changes to the payload 412.

The data packet 400 may include an m-bit sequence $b_0$, $b_1, \ldots, b_{m-2}, b_{m-1}$, and the first bit transmitted or sequentially processed may be the leftmost bit $b_0$. The numeric representation of that sequence $b_{m-1}b_{m-2} \ldots b_1b_0$ has $b_0$ as the LSB and $b_{m-1}$ as the most-significant bit (MSB). During transmission, one or more errors may occur within, e.g., the header 410, the payload 412, and/or the CRC 414. When the data packet 400 includes errors, the data packet 400 may be corrected using, e.g., the techniques described below with reference to FIGS. 5A, 5B, 5C, 5D, 6, 7, and/or 8.

FIGS. 5A-5D illustrate a data flow 500 that may be used to correct erroneous data packets that are received via an asynchronous connection-less (ACL) communication link in accordance with certain aspects of the disclosure. The data packet may be transmitted by a second device 504, and received by a first device 502. For example, the data packet may be received via an ACL communication link, and the first device 502 may correct errors in the received data packet using the techniques described below. In certain aspects, the first device 502 and the second device 504 may be BLE enabled devices. The first device 502 may correspond to, e.g., central device 102, peripheral device 104, 106, 108, 110, 112, 114, wireless device 200, the apparatus 702/702'. The second device 504 may correspond to, e.g., central device 102, peripheral device 104, 106, 108, 110, 112, 114, the wireless device 200, the second device 750. In FIGS. 5A-5D, optional operations are indicated with dashed lines.

Figure 5A:
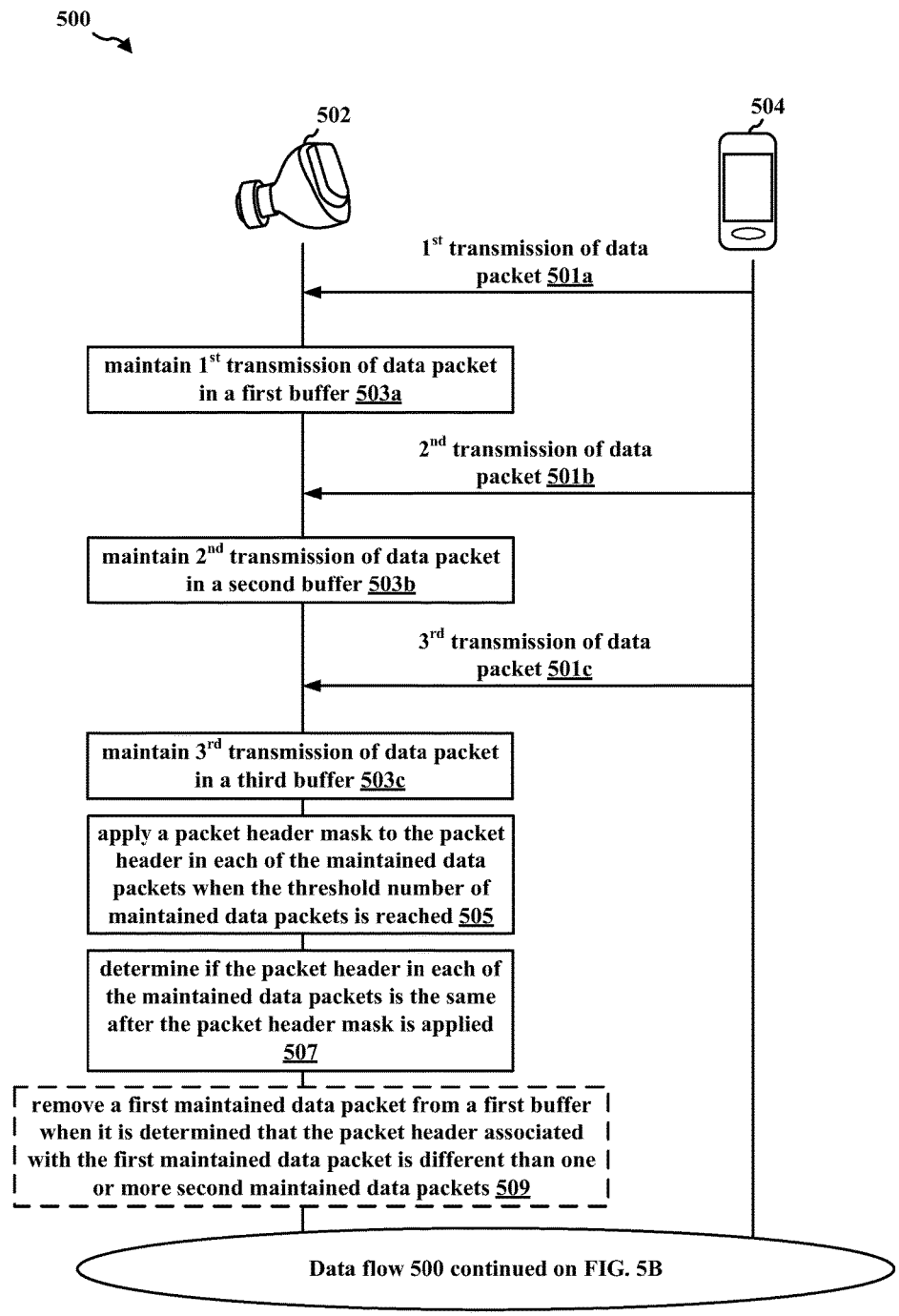
FIGS. 5A-5D illustrate a data flow that may be used to error correct a data packet in accordance with certain aspects of the disclosure.

Referring to FIG. 5A, the first device 502 may receive (at 501a) a first transmission of a data packet from the second device 504. The first device 502 may determine that the one or more of the header, the payload, and/or the CRC of the first transmission of the data packet contains at least one uncorrectable error. An uncorrectable error may be, e.g., an error that prevents the first device 502 from decoding at least a portion of the data packet. In certain aspects, the first device 502 may maintain (at 503a) the first transmission of the data packet in a first buffer. The first transmission of the data packet may be maintained, e.g., so that error correction may be performed using multiple transmissions of the same data packet where each transmission may have uncorrectable errors. An acknowledgement of the first transmission of the data packet may not be sent to the second device 504 when the first device 502 determines that the first transmission of the data packet includes an uncorrectable error. Hence, the second device 504 may send a second transmission of the data packet to the first device 502.

In certain aspects, the first device 502 may receive (at 501b) the second transmission of the data packet from the second device 504. The first device 502 may determine that the one or more of the header, the payload, and/or the CRC of the second transmission of the data packet contains at least one uncorrectable error. In certain aspects, the first device 502 may maintain (at 503b) the second transmission of the data packet in a second buffer. An acknowledgement of the second transmission of the data packet may not be sent to the second device 504 when the first device 502 determines that the second transmission of the data packet includes an uncorrectable error. Hence, the second device 504 may send a third transmission of the data packet to the first device 502.

In certain other aspects, the first device 502 may receive (at 501c) the third transmission of the data packet from the second device 504. The first device 502 may determine that the one or more of the header, the payload, and/or the CRC of the third transmission of the data packet contains at least one uncorrectable error. In certain aspects, the first device 502 may maintain (at 503c) the third transmission of the data packet in a third buffer.

In certain configurations, the first device 502 may continue to attempt decoding retransmissions of the data packet until a threshold number of maintained data packets is reached. When the threshold number of maintained data packets is reached, the first device 502 may perform the error correction techniques described below. In the example illustrated in FIGS. 5A-5D, the threshold number of maintained data packets is three. However, the threshold number of maintained data packets is not limited to three. For example, the threshold number of maintained data packets may include any number of data packets greater than two without departing from the scope of data packets.

When the threshold number of maintained data packets is reached, the first device 502 may apply (at 505) a packet header mask to the packet header in each of the maintained data packets. For example, firmware located at the first device 502 may load a 3-octet hardware register (e.g., Packet_Header_MV_Mask) to mask bits in the data packet header that may have changed between the first transmission of the data packet, second transmission of the data packet, and third transmission of the data packet. The value of the register used to mask bits in the data packet header may be, e.g., 0xFFFFFF. The types of information that may be masked in the header may be information that may change independently of whether the payload changes. For example, in the context of BLE, bits that may change independent of the payload include: next expected sequence number (NESN) bits and/or more data (MD) bits.

In certain configurations, a NESN bit or a MD bit may be irrelevant from the point of view of the present disclosure, and therefore, "irrelevant" bits should be masked out of the header completely. However, one or more of the "irrelevant" bits may become significant at a later time, and therefore, the header mask allows the "irrelevant" bits to be made significant in the future such that they may be error corrected or included in the majority voting algorithm.

Figure 5B:
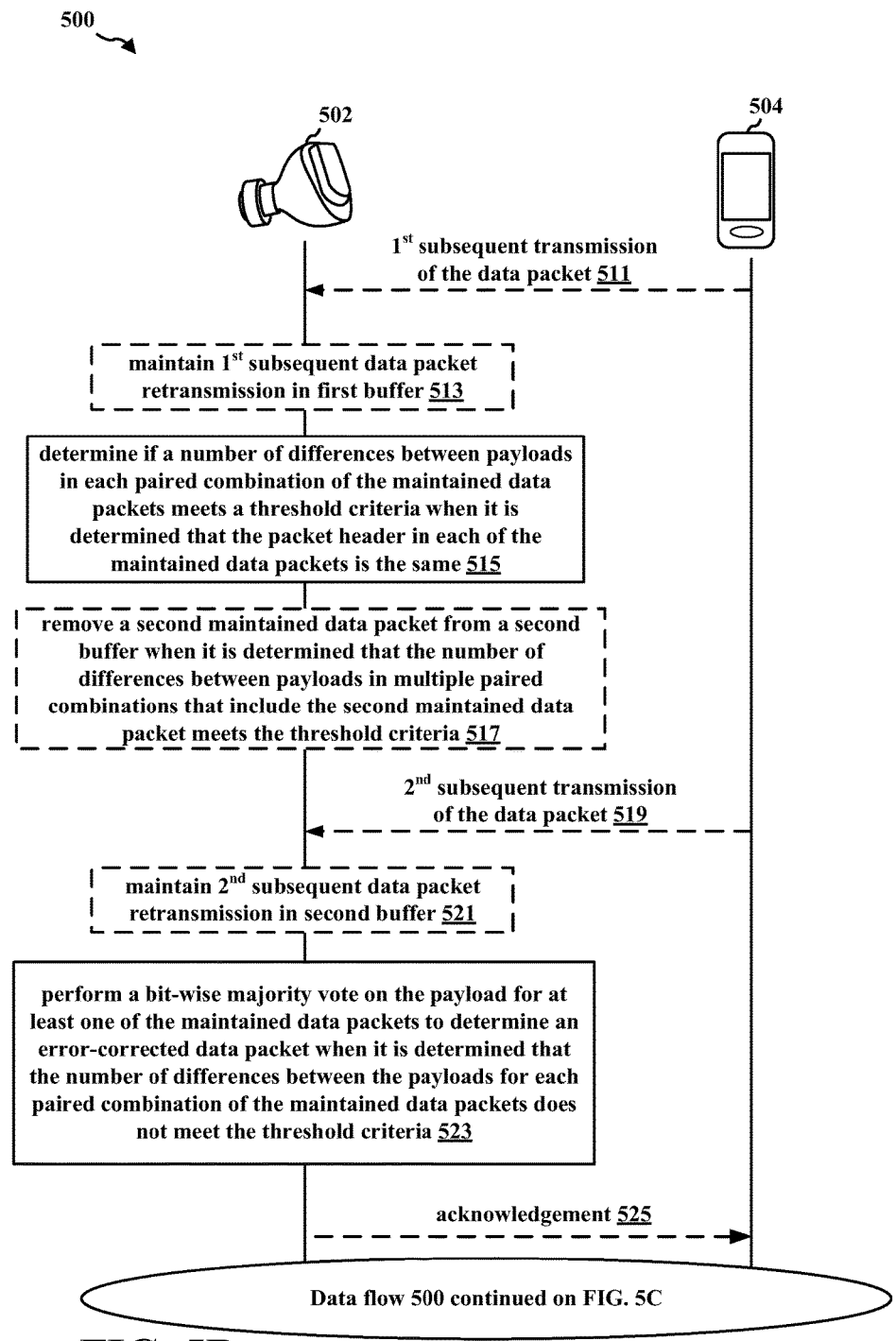

In certain aspects, the first device 502 may determine (at 507) if the packet header in each of the maintained data packets is the same after the packet header mask is applied. When it is determined that one of the packet headers is different than the other two packet headers, the data packet with the different header may be removed (at 509) from that data packet's corresponding buffer, and as seen in FIG. 5B, the first device 502 may receive (at 511) a first subsequent (e.g., fourth) transmission of the data packet. The first device 502 may determine that the one or more of the header, the payload, and/or the CRC of the first subsequent transmission of the data packet contains at least one uncorrectable error. In certain aspects, the first device 502 may maintain (at 513) the first subsequent transmission of the data packet in the buffer from which the data packet was removed (at 509). The first device 502 may then apply (at 505) the data header mask to the maintained data packets that includes the first subsequent transmission of the data packet to determine if the packet headers are all the same.

When the first device 502 determines (at 507) that the packet headers in each of the maintained data packets is the same, the first device may determine (at 515) if a number of differences between payloads in each paired combination of the maintained data packets meets a threshold criteria. For example, assume a first maintained transmission of the data packet is transmission 'A', a second maintained transmission of the data packet is transmission 'B', and a third maintained transmission of the data packet is 'C'. Here, the first device 502 may compare the payloads of each paired combination (e.g., A&B, B&C, and C&A) if maintained transmissions meets a threshold criteria (e.g., 3 or more differences).

When the first device 502 determines (at 515) that the number of differences between payloads in each paired combination of the maintained data packets meets the threshold criteria, the first device 502 may remove (at 517) a data packet from its buffer. In certain aspects, the data packet that is removed (at 517) may be the data packet that includes the largest number of uncorrectable errors or the oldest of the maintained transmissions.

As seen in FIG. 5B, the first device 502 may receive (at 519) a second subsequent transmission of the data packet, and maintain (at 521) the second subsequent transmission of the data packet in the buffer from which the data packet was removed (at 517).

When the first device determines (at 515) that the number of differences between payloads in each paired combination of the maintained data packets does not meet the threshold criteria, the first device 502 may perform (at 523) a bit-wise majority vote on the corresponding payload bits of the maintained data packets to determine an error-corrected data packet.

For example, the first device 502 may perform (at 523) the bit-wise majority vote by comparing, for example, the first bit of the payload of each of the first transmission of the data packet, the second transmission of the data packet, and the third transmission of the data packet, which for illustrative purposes may comprise first bit values of 1, 1 and 0, respectively. As the two 1's form a majority, the first device may select "1," thereby implementing a bit-wise majority vote to correct the assumed "0" error in the third transmission of the data packet. The majority-vote process may be performed for each bit of a respective data packet payload to determine a majority-voted payload.

In certain configurations, if the data packet does not include a CRC and if the payload of the data packet does not include an MIC, the first device 502 may transmit (at 525) and acknowledgement to the second device 504 when the majority-voted payload is determined. When the acknowledgement is received by the second device 504, the second device 504 may cease retransmitting the unacknowledged data packet to the first device 502.

Figure 5C:
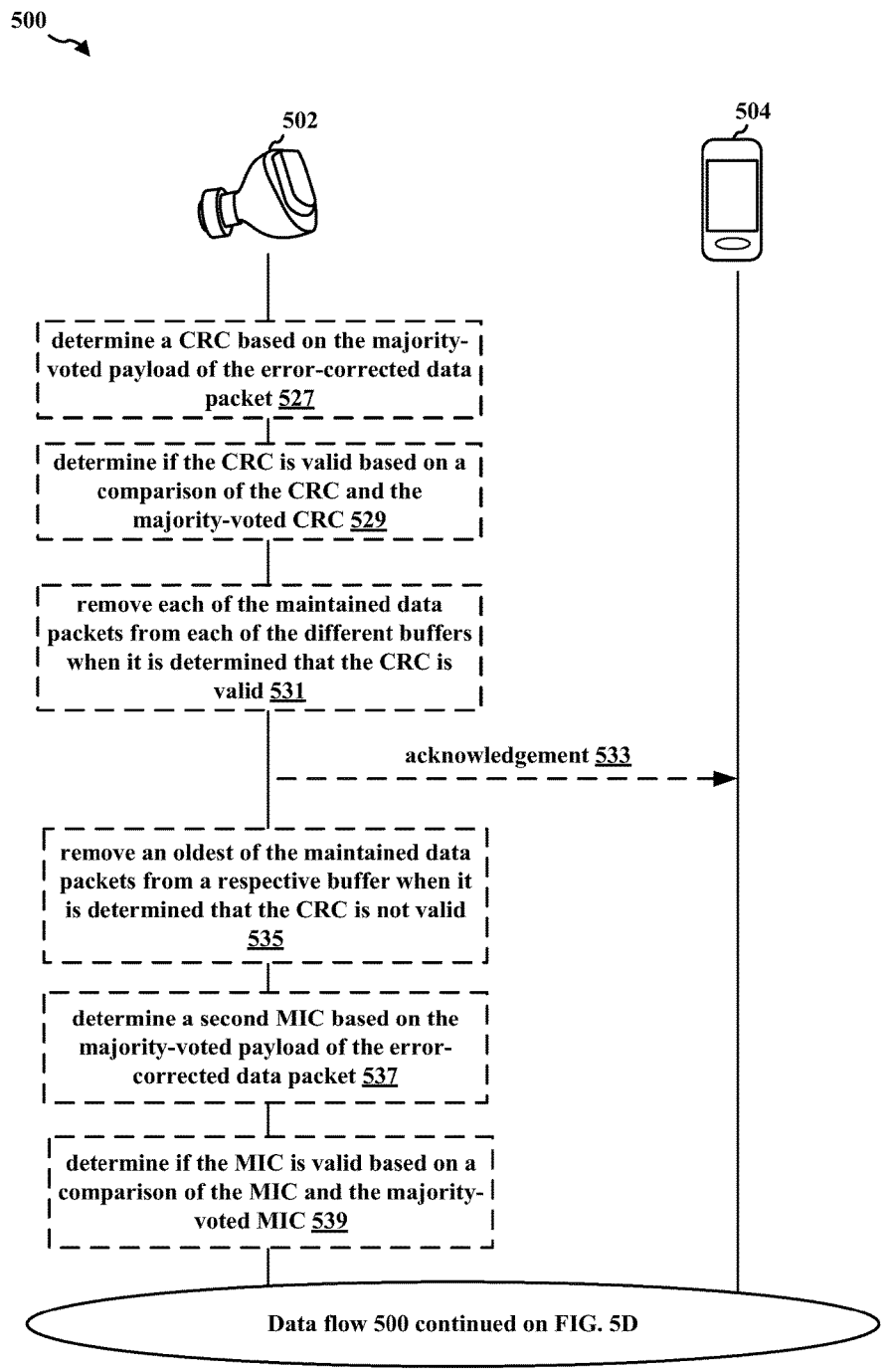

As seen in FIG. 5C, if the data packet includes a first CRC (e.g., CRC 414 in FIG. 4), the first device 502 may determine (at 527) a second CRC based on the majority-voted payload of the error-corrected data packet. The first device 502 may determine (at 529) if the second CRC is valid based on a comparison of the second CRC and the majority-voted CRC. The second CRC may be determined as valid when the second CRC and the majority-voted CRC match.

When it is determined that the second CRC is valid, the first device 502 may remove (at 531) each of the maintained data packets from each of the different buffers, and transmit (at 533) an acknowledgement to the second device 504.

Alternatively, when it is determined that the second CRC is not valid, the first device 502 may remove (at 535) an oldest of the maintained data packets from a respective buffer. The first device 502 may then receive a subsequent transmission of the data packet from the second device 504, maintain the subsequent transmission of the data packet in the empty buffer, and return to 505 in the data flow 500.

In certain other aspects, if the payload of the data packet includes an MIC, the error-corrected data packet may include a majority-voted MIC determined by the first device 502. Here, the first device 502 may determine (at 537) a second MIC based on the majority-voted payload of the error-corrected data packet, and determine (at 539) if the second MIC is valid based on a comparison of the second MIC and the majority-voted MIC. The second MIC may be determined as valid if the second MIC and the majority-voted MIC match.

Figure 5D:
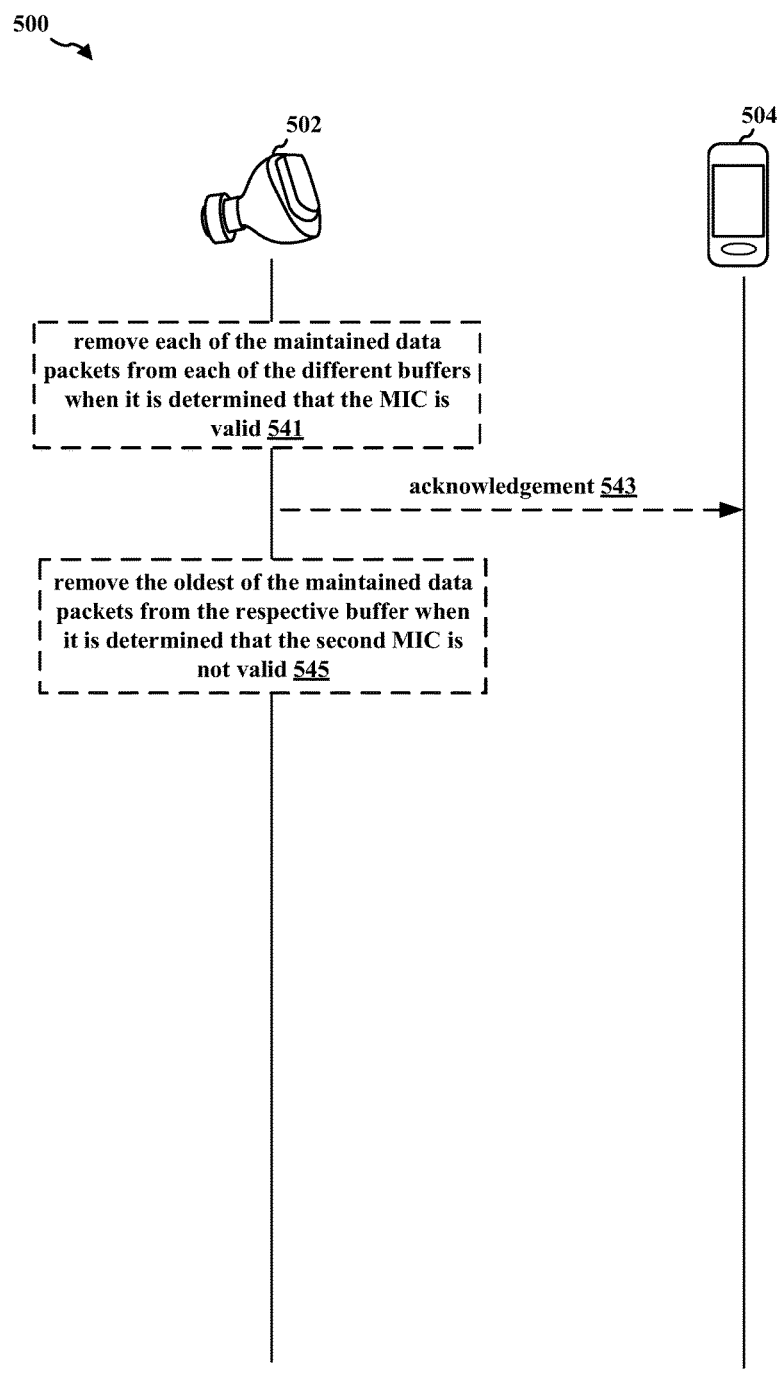

As seen in FIG. 5D, when it is determined that the second MIC is valid, the first device 502 may remove (at 541) each of the maintained data packets from each of the different buffers, and transmit (at 543) an acknowledgement to the second device 504.

Alternatively, when it is determined that the second MIC is not valid, the first device 502 may remove (at 545) an oldest of the maintained data packets from a respective buffer. The first device 502 may then receive a subsequent transmission of the data packet from the second device 504, maintain the subsequent transmission of the data packet in the empty buffer, and return to 505 in the data flow 500.

The error correction techniques described above with reference to FIGS. 5A-5D promote error-correction in communication systems that lack FEC or other embedded error correction mechanisms with respect to one or more portions of a data packet. The techniques therefore provide error correction for the entire packet, including those portions not protected by any imbedded error correction mechanism. As a result of the techniques, data communications over noisy communication mediums may be improved as the techniques may substantially reduce bit error rates, and increase the sensitivity of the receiving device such that the transmission power of a data packet may be reduced. For data communications involving voice or other streaming audio data, the techniques promote increased audio quality over systems that do not employ the techniques described in the present disclosure.

Figure 6:
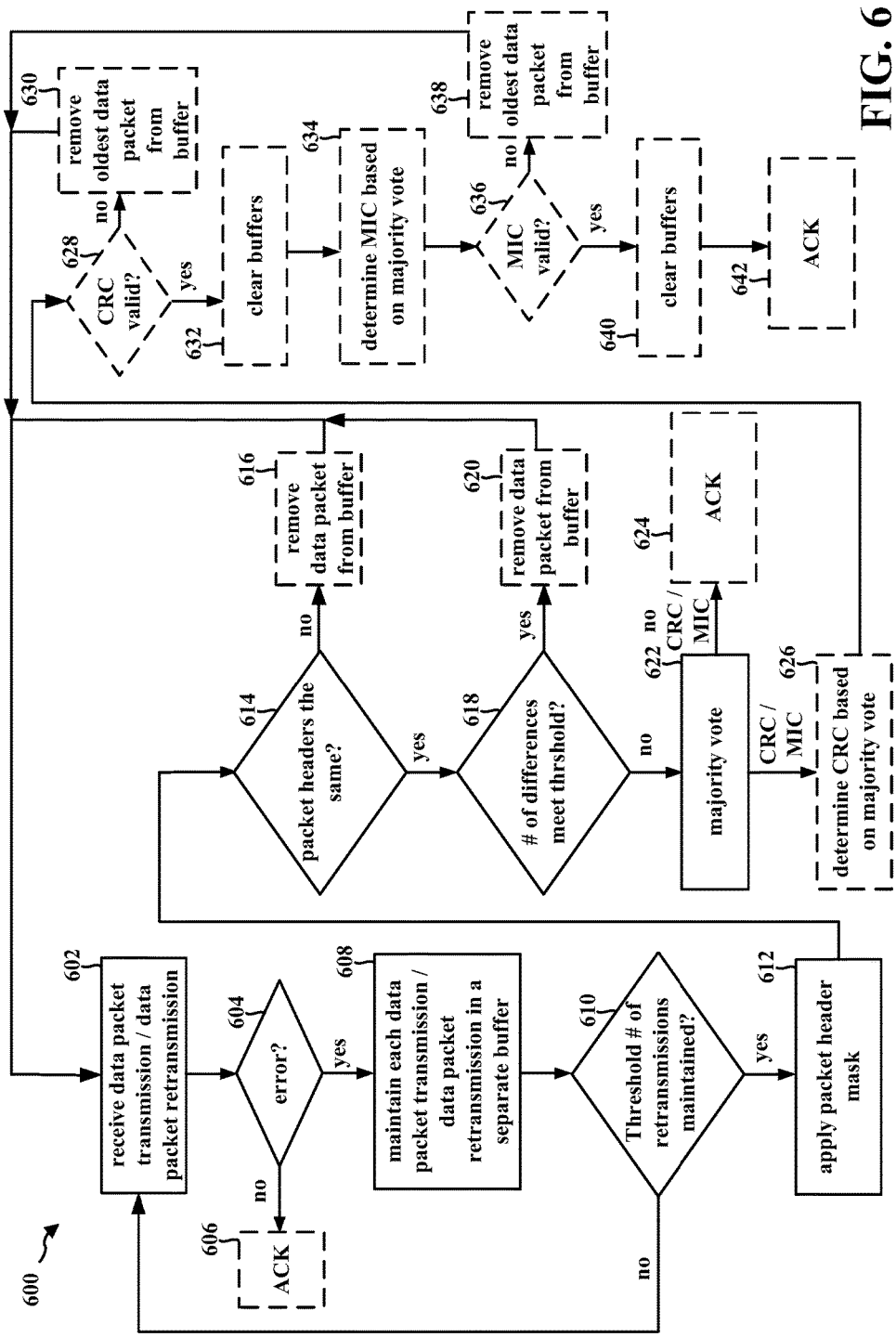
FIG. 6 is a flowchart of a method of wireless communication.

FIG. 6 is a flowchart 600 of a method of wireless communication. The method may be performed by a first device (e.g., central device 102, peripheral device 104, 106, 108, 110, 112, 114, wireless device 200, the apparatus 702/702') in communication with a second device (e.g., central device 102, peripheral device 104, 106, 108, 110, 112, 114, wireless device 200, second device 504, 750). In FIG. 6, optional operations are indicated with dashed lines.

Referring to FIG. 6, at 602, the first device may receive an original data packet transmission and/or a data packet retransmission from a second device when a previous data packet transmission is unacknowledged by the first device. In one aspect the data packet may include at least a packet header and a payload. For example, referring to FIG. 4, the data packet 400 may include a preamble 402, a coded access address 404, an access code trailer 406, a rate indicator 408, a header 410, a payload 412, and a CRC 414. Referring to FIG. 5A, the first device 502 may receive (at 501a) a first transmission of a data packet from the second device 504, the first device 502 may receive (at 501b) the second transmission of the data packet from the second device 504, and the first device 502 may receive (at 501c) a third transmission of the data packet from the second device 504.

At 604, the first device may determine if there is an error associated with the transmission of the data packet and/or a retransmission of the data packet. For example, referring to FIG. 5A, the first device 502 may determine that the one or more of the header, the payload, and/or the CRC of the first transmission of the data packet contains at least one uncorrectable error. An uncorrectable error may be, e.g., an error that keeps the first device 502 from being able to decode at least a portion of the data packet. An acknowledgement of the first transmission of the data packet may not be sent to the second device 504 when the first device 502 determines that the first transmission of the data packet includes an uncorrectable error. Hence, the second device 504 may send a second transmission of the data packet to the first device 502. The first device 502 may determine that the one or more of the header, the payload, and/or the CRC of the second transmission of the data packet contains at least one uncorrectable error. An acknowledgement of the second transmission of the data packet may not be sent to the second device 504 when the first device 502 determines that the second transmission of the data packet includes an uncorrectable error. Hence, the second device 504 may send a third transmission of the data packet to the first device 502. The first device 502 may determine that the one or more of the header, the payload, and/or the CRC of the third transmission of the data packet contains at least one uncorrectable error.

At 606, when it is determined that one or more of the first transmission of the data packet, the second transmission of the data packet (e.g., the first retransmission), and/or the third transmission of the data packet (e.g., the second retransmission) does not include an uncorrectable error, the first device may transmit an acknowledgement to the second device.

At 608, when it is determined that the first transmission of the data packet includes an uncorrectable error, the first device may maintain the first transmission of the data packet in a first buffer. When it is determined that the second transmission of the data packet includes an uncorrectable error, the first device may maintain the second transmission of the data packet in a second buffer. When it is determined that the third transmission of the data packet includes an uncorrectable error, the first device may maintain the third transmission of the data packet in a third buffer. In certain aspects, the first buffer, the second buffer, and the third buffer may be different buffers. For example, referring to FIG. 5A, the first device 502 may maintain (at 503a) the first transmission of the data packet in a first buffer. The first transmission of the data packet may be maintained, e.g., so that error correction can be performed in multiple transmissions of the same data packet have uncorrectable errors. In certain aspects, the first device 502 may maintain (at 503b) the second transmission of the data packet in a second buffer. In certain other aspects, the first device 502 may maintain (at 503c) the third transmission of the data packet in a third buffer.

At 610, each time the original data transmission of the data packet or a retransmission of the data packet is maintained in a buffer, the first device may determine if a threshold number of retransmissions of the data packet has been met. For example, referring to FIG. 5A, the first device 502 may continue to attempt decoding retransmissions of the data packet until a threshold number of maintained data packets is reached.

When it is determined that the threshold number of maintained data packets has not been reached, the first device may return to the operation at 602.

At 612, when it is determined that the threshold number of maintained data packets has been reached, the first device may apply a packet header mask to the packet header in each of the maintained data packets. For example, referring to FIG. 5A, the first device 502 may apply (at 505) a packet header mask to the packet header in each of the maintained data packets. For example, firmware located at the first device 502 may load a 3-octet hardware register (e.g., Packet_Header_MV_Mask) to mask bits in the data packet header that may have changed between the first transmission of the data packet, second transmission of the data packet, and third transmission of the data packet. The value of the register used to mask bits in the data packet header may be, e.g., 0xFFFFFF.

At 614, the first device may determine if the packet header in each of the maintained data packets is the same after the packet header mask is applied. For example, referring to FIG. 5A, the first device 502 may determine (at 507) if the packet header in each of the maintained data packets is the same after the packet header mask is applied.

At 616, when it is determined that at least one of the packet headers (e.g., a packet header in the first maintained data packet) is different than the other two packet headers, the first device may remove the first maintained data packet from a first buffer. For example, referring to FIG. 5A, when it is determined that at least one of the packet headers (e.g., a packet header in the first maintained data packet) is different than the other two packet headers the data packet with the different header may be removed (at 509) from the its buffer.

When the first maintained data packet is removed from its buffer, the first device may return to operation 602. For example, referring to 5B, the first device may receive a first subsequent transmission of the data packet. The first device 502 may determine that the one or more of the header, the payload, and/or the CRC of the first subsequent transmission of the data packet contains at least one uncorrectable error. In certain aspects, the first device 502 may maintain (at 513) the first subsequent transmission of the data packet in the buffer from which the data packet was removed (at 509). The first device 502 may then apply (at 505) the data header mask to the maintained data packets that includes the first subsequent transmission of the data packet to determine if the packet headers are all the same.

At 618, when it is determined (at 614) that the packet header in each of the maintained data packets is the same after the packet header mask is applied, the first device may determine if a number of differences between payloads in each paired combination of the maintained data packets meets a threshold criteria. For example, referring to FIG. 5B, when the first device 502 determines (at 507) that the packet headers in each of the maintained data packets is the same, the first device may determine (at 515) if a number of differences between payloads in each paired combination of the maintained data packets meets a threshold criteria. For example, assume a first maintained transmission of the data packet is transmission 'A', a second maintained transmission of the data packet is transmission 'B', and a third maintained transmission of the data packet is 'C'. Here, the first device 502 may compare the payloads of each paired combination (e.g., A&B, B&C, and C&A) and determine if each paired combination of the maintained transmissions meets a threshold criteria (e.g., 3 or more differences).

At 620, when it is determined (at 618) that the number of differences between payloads in multiple paired combinations that include a second maintained data packet meets the threshold criteria, the first device may remove the second maintained data packet from the second buffer. For example, referring to FIG. 5B, when the first device 502 determines (at 515) that the number of differences between payloads in each paired combination of the maintained data packets meets the threshold criteria, the first device 502 may remove (at 517) a data packet from its buffer. In certain aspects, the data packet that is removed (at 517) may be the data packet that includes the largest number of uncorrectable errors or the oldest of the maintained transmissions.

When the data packet is removed (at 620) from its buffer, the first device may return to operation 602. For example, referring to FIG. 5B, the first device 502 may receive (at 519) a second subsequent transmission of the data packet, and maintain (at 521) the second subsequent transmission of the data packet in the buffer from which the data packet was removed (at 517).

At 622, when it is determined (at 618) that the number of differences between the payloads for each paired combination of the maintained data packets does not meet the threshold criteria, the first device may perform a bit-wise majority vote corresponding payload bits of the maintained data packets to determine an error-corrected data packet. In one aspect, the error-corrected data packet may include a majority-voted payload. For example, referring to FIG. 5B, When the first device determines (at 515) that the number of differences between payloads in each paired combination of the maintained data packets does not meet the threshold criteria, the first device 502 may perform (at 523) a bit-wise majority vote on the corresponding payload bits of the maintained data packets to determine an error-corrected data packet. For example, the first device 502 may perform (at 523) the bit-wise majority vote by comparing, for example, the first bit of the payload of each of the first transmission of the data packet, the second transmission of the data packet, and the third transmission of the data packet, which for illustrative purposes may comprise first bit values of 1, 1 and 0, respectively. As the two 1's form a majority, the first device may select "1," thereby implementing a bit-wise majority vote to correct the assumed "0" error in the third transmission of the data packet. The majority-vote process may be performed for each bit of a respective data packet payload to determine a majority-voted payload.

At 624, the first device may transmit an acknowledgement to the second device when the error-corrected data packet is generated and when the data packet does not include a CRC. For example, referring to FIG. 5B, if the data packet does not include a CRC, the first device 502 may transmit (at 525) and acknowledgement to the second device 504 when the majority-voted payload is determined.

At 626, the first device may determine a second CRC based on the majority-voted payload of the error-corrected data packet when the data packet includes a CRC. The error-corrected data packet may include a majority-voted CRC. For example, referring to FIG. 5C, if the data packet includes a first CRC (e.g., CRC 414 in FIG. 4), the first device 502 may determine (at 527) a second CRC based on the majority-voted payload of the error-corrected data packet.

At 628, the first device may determine if the second CRC is valid based on a comparison of the second CRC and the majority-voted CRC. For example, referring to FIG. 5C, the first device 502 may determine (at 529) if the second CRC is valid based on a comparison of the second CRC and the majority-voted CRC.

At 630, when it is determined that the second CRC is not valid, the first device may remove an oldest of the maintained data packets from a respective buffer. For example, referring to FIG. 5C, when it is determined that the second CRC is not valid, the first device 502 may remove (at 535) an oldest of the maintained data packets from a respective buffer.

At 632, when it is determined (at 628) that the second CRC is valid, the first device may remove each of the maintained data packets from each of the different buffers. For example, referring to FIG. 5C, when it is determined that the second CRC is valid, the first device 502 may remove (at 531) each of the maintained data packets from each of the different buffers.

If there is no MIC in the payload, then the operation proceeds to 642. If there is an MIC in the payload, then the operation proceeds to 634.

At 634, the first device may determine a second MIC based on the majority-voted payload of the error-corrected data packet. For example, referring to FIG. 5C, if the payload of the data packet includes an MIC, the error-corrected data packet may include a majority-voted MIC the first device 502. Here, the first device 502 may determine (at 537) a second MIC based on the majority-voted payload of the error-corrected data packet.

At 636, the first device may determine if the second MIC is valid based on a comparison of the second MIC and the majority-voted MIC. For example, referring to FIG. 5C, the first device determine (at 539) if the second MIC is valid based on a comparison of the second MIC and the majority-voted MIC.

At 638, when it is determined (at 636) that the second MIC is not valid, the first device may remove the oldest of the maintained data packets from the respective buffer. For example, referring to FIG. 5D, when it is determined that the second MIC is not valid, the first device 502 may remove (at 545) an oldest of the maintained data packets from a respective buffer.

The operation may then return to 602. For example, referring to FIGS. 5A-5D, the first device 502 may then receive a subsequent transmission of the data packet from the second device 504, maintain the subsequent transmission of the data packet in the empty buffer, and return to 505 in the data flow 500.

At 640, when it is determined (at 636) that the second MIC is valid, the first device may remove each of the maintained data packets from each of the different buffers. For example, referring to FIG. 5D, when it is determined that the second MIC is valid, the first device 502 may remove (at 541) each of the maintained data packets from each of the different buffers.

At 642, the first device may transmit an acknowledgement to the first device. For example, referring to FIG. 5D, the first device 502 may transmit (at 543) an acknowledgement to the second device 504.

Figure 7:
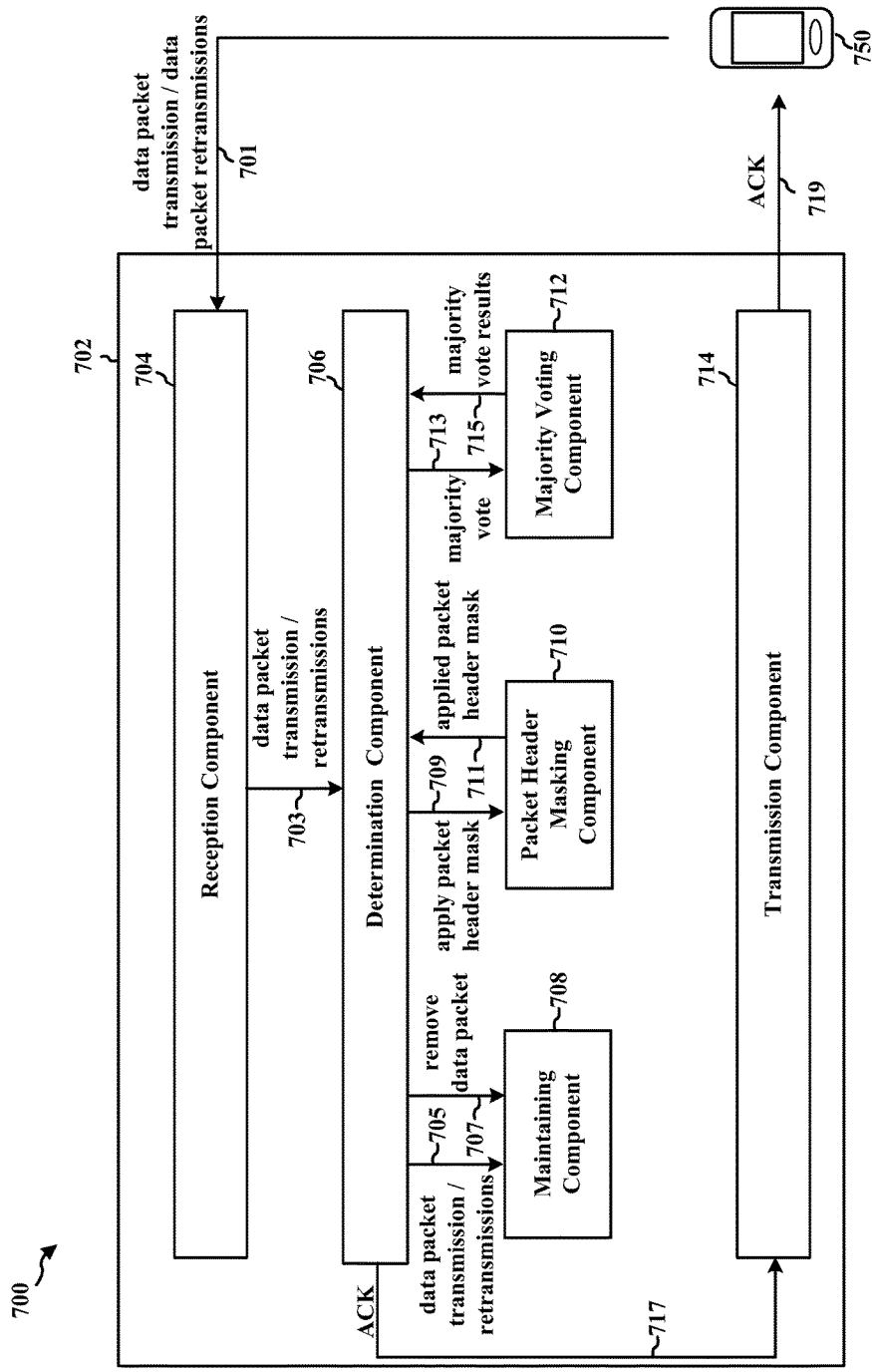
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a first device (e.g., central device 102, peripheral device 104, 106, 108, 110, 112, 114, wireless device 200, first device 502, the apparatus 702') in communication with a second device 750 (e.g., central device 102, peripheral device 104, 106, 108, 110, 112, 114, wireless device 200, second device 504). The apparatus may include a reception component 704, a determination component 706, a maintaining component 708, a packet header masking component 710, a majority voting component 712, and a transmission component 714.

The reception component 704 may be configured to receive a data packet retransmission 701 from the second device 750 when a previous data packet transmission 701 is unacknowledged by the first device. In one aspect, the data packet may include one or more of a packet header, a payload, a MIC, and/or a CRC. In certain configurations, the data packet transmission/retransmission 701 may be received via an ACL communication link. The reception component 704 may be configured to send a signal 703 associated with the data packet transmission and/or the data packet retransmission to the determination component 706.

The determination component 706 may be configured to determine if the data packet transmission/data packet retransmission includes an uncorrectable error. The determination component 706 may be configured to send a signal 705 associated with the data packet transmission and/or the data packet retransmission to the maintaining component 708 when an uncorrectable error is determined.

The maintaining component 708 may be configured to maintain each transmission of the data packet up to a threshold number of maintained data packets when the data packet is unacknowledged by the first device.

The determination component 706 may be configured to determine if a threshold number of maintained data packets is reached. The determination component 706 may be configured to send a signal 709 indicating to the packet header masking component 710 to apply a packet header mask to the head of each of the maintained data packets.

The packet header masking component 710 may be configured to apply a packet header mask to the packet header in each of the maintained data packets when the threshold number of maintained data packets is reached. The packet header masking component 710 may be configured to send a signal 711 associated with the maintained data packets with the packet header mask applied thereto to the determination component 706.

The determination component 706 may be configured to determine if the packet header in each of the maintained data packets is the same after the packet header mask is applied. The determination component 706 may be configured to determine if a number of differences between payloads in each paired combination of the maintained data packets meets a threshold criteria when it is determined that the packet header in each of the maintained data packets is the same after the packet header mask is applied. The determination component 706 may be configured to send a signal 707 instructing the maintaining component 708 to remove a maintained data packet when it is determined that the number of differences between payloads in each paired combination of the maintained data packets meets the threshold criteria. The determination component 706 may be configured to send a signal 713 instructing the majority voting component 712 to apply a majority vote process to the maintained data packets when it is determined that the threshold criteria is not met.

The maintaining component 708 may be configured to remove a first maintained data packet from a first buffer when it is determined that the packet header associated with the first maintained data packet is different than one or more second maintained data packets. The maintaining component 708 may be configured to maintain a first subsequent retransmission of the data packet 701 in the first buffer when the first maintained data packet is removed from the first buffer and the first subsequent retransmission is determined to have an uncorrectable error. The maintaining component 708 may be configured to remove a second maintained data packet from a second buffer when it is determined that the number of differences between payloads in multiple paired combinations that include the second maintained data packet meets the threshold criteria. The maintaining component 708 may be configured to maintain a second subsequent retransmission of data packet in the second buffer when the second maintained data packet is removed from the second buffer when it is determined that the second subsequent retransmission includes an uncorrectable error.

The majority voting component 712 may be configured to perform a bit-wise majority vote on corresponding payload bits of the maintained data packets to determine an error-corrected data packet when it is determined that the number of differences between the payloads for each paired combination of the maintained data packets does not meet the threshold criteria. In one aspect, the error-corrected data packet may include a majority-voted payload, a majority-voted MIC, and/or a majority-voted CRC. The majority voting component 712 may be configured to send a signal 715 associated with the majority vote results to the determination component 706.

The determination component 706 may be configured to determine a second CRC based on the majority-voted payload of the error-corrected data packet. The determination component 706 may be configured to determine if the second CRC is valid based on a comparison of the second CRC and the majority-voted CRC. The determination component 706 may be configured to send a signal 707 instructing the maintaining component 708 to remove each of the maintained data packets from each of the different buffers when it is determined that the second CRC is valid. The determination component 706 may be configured to send a signal 707 instructing the maintaining component 708 to remove an oldest of the maintained data packets from a respective buffer when it is determined that the second CRC is not valid.

The maintaining component 708 may be configured to remove each of the maintained data packets from each of the different buffers when it is determined that the second CRC is valid. The maintaining component 708 may be configured to remove an oldest of the maintained data packets from a respective buffer when it is determined that the second CRC is not valid.

The determination component 706 may be configured to determine a second MIC based on the majority-voted payload of the error-corrected data packet. The determination component 706 may be configured to determine if the second MIC is valid based on a comparison of the second MIC and the majority-voted MIC. The determination component 706 may be configured to send a signal 707 instructing the maintaining component 708 to remove each of the maintained data packets from each of the different buffers when it is determined that the second MIC is valid. The determination component 706 may be configured to send a signal 707 instructing the maintaining component 708 to remove the oldest of the maintained data packets from the respective buffer when it is determined that the second MIC is not valid.

The maintaining component 708 may be configured to remove each of the maintained data packets from each of the different buffers when it is determined that the second MIC is valid. The maintaining component 708 may be configured to remove the oldest of the maintained data packets from the respective buffer when it is determined that the second MIC is not valid.

When the error-corrected data packet is determined, the second CRC is determined to be valid, and/or the second MIC is determined to be valid, the determination component 706 may be configured to send a signal 717 instructing the transmission component 714 to transmit an acknowledgement 719 to the second device 750.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
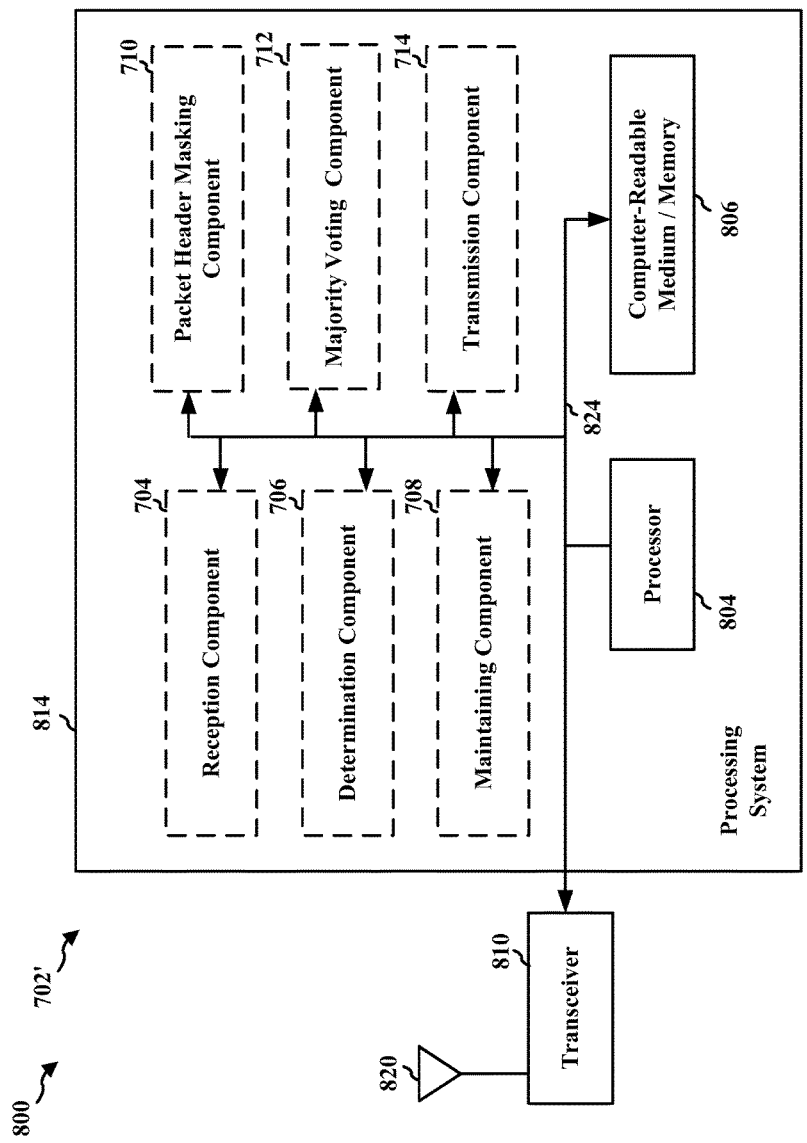
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 714, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof.

In one configuration, the apparatus 702/702' for wireless communication may include means for receiving a data packet retransmission from a second device when a previous data packet transmission is unacknowledged by the first device. In one aspect, the data packet may include one or more of a packet header, a payload, a MIC, and/or a CRC. In one configuration, the apparatus 702/702' for wireless communication may include means for maintaining each transmission of the data packet up to a threshold number of maintained data packets when the data packet is unacknowledged by the first device. In one configuration, the apparatus 702/702' for wireless communication may include means for applying a packet header mask to the packet header in each of the maintained data packets when the threshold number of maintained data packets is reached. In one configuration, the apparatus 702/702' for wireless communication may include means for determining if the packet header in each of the maintained data packets is the same after the packet header mask is applied. In one configuration, the apparatus 702/702' for wireless communication may include means for determining if a number of differences between payloads in each paired combination of the maintained data packets meets a threshold criteria when it is determined that the packet header in each of the maintained data packets is the same after the packet header mask is applied. In one configuration, the apparatus 702/702' for wireless communication may include means for performing a bit-wise majority vote on the payload on corresponding payload bits of the maintained data packets to determine an error-corrected data packet when it is determined that the number of differences between the payloads for each paired combination of the maintained data packets does not meet the threshold criteria. In one aspect, the error-corrected data packet may include one or more of a majority-voted payload, a majority-voted MIC, and/or a majority-voted CRC. In one configuration, the apparatus 702/702' for wireless communication may include means for removing a first maintained data packet from a first buffer when it is determined that the packet header associated with the first maintained data packet is different than one or more second maintained data packets. In one configuration, the apparatus 702/702' for wireless communication may include means for maintaining a first subsequent retransmission of the data packet in the first buffer when the first maintained data packet is removed from the first buffer. In one configuration, the apparatus 702/702' for wireless communication may include means for removing a second maintained data packet from a second buffer when it is determined that the number of differences between payloads in multiple paired combinations that include the second maintained data packet meets the threshold criteria. In one configuration, the apparatus 702/702' for wireless communication may include means for maintaining a second subsequent retransmission of data packet in the second buffer when the second maintained data packet is removed from the second buffer. In one configuration, the apparatus 702/702' for wireless communication may include means for determining a second CRC based on the majority-voted payload of the error-corrected data packet. In one configuration, the apparatus 702/702' for wireless communication may include means for determining if the second CRC is valid based on a comparison of the second CRC and the majority-voted CRC. In one configuration, the apparatus 702/702' for wireless communication may include means for removing each of the maintained data packets from each of the different buffers when it is determined that the second CRC is valid. In one configuration, the apparatus 702/702' for wireless communication may include means for removing an oldest of the maintained data packets from a respective buffer when it is determined that the second CRC is not valid. In one configuration, the apparatus 702/702' for wireless communication may include means for determining a second MIC based on the majority-voted payload of the error-corrected data packet. In one configuration, the apparatus 702/702' for wireless communication may include means for determining if the second MIC is valid based on a comparison of the second MIC and the majority-voted MIC. In one configuration, the apparatus 702/702' for wireless communication may include means for removing each of the maintained data packets from each of the different buffers when it is determined that the second MIC is valid. In one configuration, the apparatus 702/702' for wireless communication may include means for removing the oldest of the maintained data packets from the respective buffer when it is determined that the second MIC is not valid. The aforementioned means may be one or more of the aforementioned processor(s) 202, short-range communications controller 252, and/or radio 230 in FIG. 2, components of the apparatus 702 and/or the processing system 814 of the apparatus 702' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a first device configured for wireless communications over a short-range wireless area network with a second device configured for wireless communications, comprising:
   receiving, by the first device over the short-range wireless area network, a retransmission of a data packet from the second device when a previous transmission of the data packet is unacknowledged by the first device, the data packet including at least a packet header and a payload;
   maintaining, by the first device, each transmission of the data packet up to a threshold number of the maintained data packets when the data packet is unacknowledged by the first device;
   applying, by the first device, a packet header mask to the packet header in each of the maintained data packets when the threshold number of maintained data packets is reached;
   determining, by the first device, if the packet header in each of the maintained data packets is the same after the packet header mask is applied;
   determining, by the first device, if a number of differences between payloads in each paired combination of the maintained data packets meets a threshold criteria when it is determined that the packet header in each of the maintained data packets is the same after the packet header mask is applied; and
   performing, by the first device, a bit-wise majority vote on the payload on corresponding payload bits of the maintained data packets to determine an error-corrected data packet when it is determined that the number of differences between the payloads for each paired combination of the maintained data packets does not meet the threshold criteria, the error-corrected data packet including a majority-voted payload.

2. The method of claim 1, wherein the data packet retransmission is received via an asynchronous connectionless (ACL) communication link.

3. The method of claim 1, further comprising:
   removing, by the first device, a first maintained data packet from a first buffer when it is determined that the packet header associated with the first maintained data packet is different than one or more second maintained data packets; and
   maintaining, by the first device, a first subsequent retransmission of the data packet in the first buffer when the first maintained data packet is removed from the first buffer.

4. The method of claim 3, further comprising:
   removing, by the first device, a second maintained data packet from a second buffer when it is determined that the number of differences between payloads in multiple paired combinations that include the second maintained data packet meets the threshold criteria; and
   maintaining, by the first device, a second subsequent retransmission of data packet in the second buffer when the second maintained data packet is removed from the second buffer.

5. The method of claim 4, wherein the data packet further includes a cyclic redundancy check (CRC), and wherein the error-corrected data packet includes a majority-voted CRC, the method further comprising:
  determining, by the first device, a second CRC based on the majority-voted payload of the error-corrected data packet;
  determining, by the first device, if the second CRC is valid based on a comparison of the second CRC and the majority-voted CRC;
  removing, by the first device, each of the maintained data packets from each of the different buffers when it is determined that the second CRC is valid; and
  removing, by the first device, an oldest of the maintained data packets from a respective buffer when it is determined that the second CRC is not valid.

6. The method of claim 5, wherein the data packet further includes a message integrity check (MIC), and wherein the error-corrected data packet includes a majority-voted MIC, the method further comprising:
  determining, by the first device, a second MIC based on the majority-voted payload of the error-corrected data packet;
  determining, by the first device, if the second MIC is valid based on a comparison of the second MIC and the majority-voted MIC;
  removing, by the first device, each of the maintained data packets from each of the different buffers when it is determined that the second MIC is valid; and
  removing, by the first device, the oldest of the maintained data packets from the respective buffer when it is determined that the second MIC is not valid.

7. An apparatus for wireless communication by a first device configured for wireless communications over a short-range wireless area network with a second device configured for wireless communications, comprising:
  means for receiving a retransmission of a data packet from the second device when a previous transmission of the data packet is unacknowledged by the first device, the data packet including at least a packet header and a payload;
  means for maintaining each transmission of the data packet up to a threshold number of the maintained data packets when the data packet is unacknowledged by the first device;
  means for applying a packet header mask to the packet header in each of the maintained data packets when the threshold number of maintained data packets is reached;
  means for determining if the packet header in each of the maintained data packets is the same after the packet header mask is applied;
  means for determining if a number of differences between payloads in each paired combination of the maintained data packets meets a threshold criteria when it is determined that the packet header in each of the maintained data packets is the same after the packet header mask is applied; and
  means for performing a bit-wise majority vote on the payload on corresponding payload bits of the maintained data packets to determine an error-corrected data packet when it is determined that the number of differences between the payloads for each paired combination of the maintained data packets does not meet the threshold criteria, the error-corrected data packet including a majority-voted payload.

8. The apparatus of claim 7, wherein the data packet retransmission is received via an asynchronous connection-less (ACL) communication link.

9. The apparatus of claim 7, further comprising:
  means for removing a first maintained data packet from a first buffer when it is determined that the packet header associated with the first maintained data packet is different than one or more second maintained data packets; and
  means for maintaining a first subsequent retransmission of the data packet in the first buffer when the first maintained data packet is removed from the first buffer.

10. The apparatus of claim 9, further comprising:
  means for removing a second maintained data packet from a second buffer when it is determined that the number of differences between payloads in multiple paired combinations that include the second maintained data packet meets the threshold criteria; and
  means for maintaining a second subsequent retransmission of data packet in the second buffer when the second maintained data packet is removed from the second buffer.

11. The apparatus of claim 10, wherein the data packet further includes a cyclic redundancy check (CRC), and wherein the error-corrected data packet includes a majority-voted CRC, the apparatus further comprising:
  means for determining a second CRC based on the majority-voted payload of the error-corrected data packet;
  means for determining if the second CRC is valid based on a comparison of the second CRC and the majority-voted CRC;
  means for removing each of the maintained data packets from each of the different buffers when it is determined that the second CRC is valid; and
  means for removing an oldest of the maintained data packets from a respective buffer when it is determined that the second CRC is not valid.

12. The apparatus of claim 11, wherein the data packet further includes a message integrity check (MIC), and wherein the error-corrected data packet includes a majority-voted MIC, the apparatus further comprising:
  means for determining a second MIC based on the majority-voted payload of the error-corrected data packet;
  means for determining if the second MIC is valid based on a comparison of the second MIC and the majority-voted MIC;
  means for removing each of the maintained data packets from each of the different buffers when it is determined that the second MIC is valid; and
  means for removing the oldest of the maintained data packets from the respective buffer when it is determined that the second MIC is not valid.

13. An apparatus for wireless communication for a first device configured for wireless communications over a short-range wireless area network with a second device configured for wireless communications, comprising:
  a memory; and
  at least one processor coupled to the memory and configured to:
    receive a retransmission of a data packet from the second device when a previous transmission of the data packet is unacknowledged by the first device, the data packet including at least a packet header and a payload;
    maintain each transmission of the data packet up to a threshold number of the maintained data packets when the data packet is unacknowledged by the first device;

apply a packet header mask to the packet header in each of the maintained data packets when the threshold number of maintained data packets is reached;

determine if the packet header in each of the maintained data packets is the same after the packet header mask is applied;

determine if a number of differences between payloads in each paired combination of the maintained data packets meets a threshold criteria when it is determined that the packet header in each of the maintained data packets is the same after the packet header mask is applied; and perform a bit-wise majority vote on the payload on corresponding payload bits of the maintained data packets to determine an error-corrected data packet when it is determined that the number of differences between the payloads for each paired combination of the maintained data packets does not meet the threshold criteria, the error-corrected data packet including a majority-voted payload.

14. The apparatus of claim 13, wherein the data packet retransmission is received via an asynchronous connection-less (ACL) communication link.

15. The apparatus of claim 13, wherein the at least one processor is further configured to:

remove a first maintained data packet from a first buffer when it is determined that the packet header associated with the first maintained data packet is different than one or more second maintained data packets; and maintain a first subsequent retransmission of the data packet in the first buffer when the first maintained data packet is removed from the first buffer.

16. The apparatus of claim 15, wherein the at least one processor is further configured to:

remove a second maintained data packet from a second buffer when it is determined that the number of differences between payloads in multiple paired combinations that include the second maintained data packet meets the threshold criteria; and maintain a second subsequent retransmission of data packet in the second buffer when the second maintained data packet is removed from the second buffer.

17. The apparatus of claim 16, wherein the data packet further includes a cyclic redundancy check (CRC), wherein the error-corrected data packet includes a majority-voted CRC, and wherein the at least one processor is further configured to:

determine a second CRC based on the majority-voted payload of the error-corrected data packet;

determine if the second CRC is valid based on a comparison of the second CRC and the majority-voted CRC;

remove each of the maintained data packets from each of the different buffers when it is determined that the second CRC is valid; and remove an oldest of the maintained data packets from a respective buffer when it is determined that the second CRC is not valid.

18. The apparatus of claim 17, wherein the data packet further includes a message integrity check (MIC), wherein the error-corrected data packet includes a majority-voted MIC, and wherein the at least one processor is further configured to:

determine a second MIC based on the majority-voted payload of the error-corrected data packet;

determine if the second MIC is valid based on a comparison of the second MIC and the majority-voted MIC;

remove each of the maintained data packets from each of the different buffers when it is determined that the second MIC is valid; and remove the oldest of the maintained data packets from the respective buffer when it is determined that the second MIC is not valid.

19. A non-transitory, computer-readable medium storing computer executable code for wireless communications by a first device configured for wireless communications over a short-range wireless area network with a second device configured for wireless communications, comprising code to:

receive, by the first device, a retransmission of a data packet from the second device when a previous transmission of the data packet is unacknowledged by the first device, the data packet including at least a packet header and a payload;

maintain, by the first device, each transmission of the data packet up to a threshold number of the maintained data packets when the data packet is unacknowledged by the first device;

apply, by the first device, a packet header mask to the packet header in each of the maintained data packets when the threshold number of maintained data packets is reached;

determine, by the first device, if the packet header in each of the maintained data packets is the same after the packet header mask is applied;

determine, by the first device, if a number of differences between payloads in each paired combination of the maintained data packets meets a threshold criteria when it is determined that the packet header in each of the maintained data packets is the same after the packet header mask is applied; and perform, by the first device, a bit-wise majority vote on the payload on corresponding payload bits of the maintained data packets to determine an error-corrected data packet when it is determined that the number of differences between the payloads for each paired combination of the maintained data packets does not meet the threshold criteria, the error-corrected data packet including a majority-voted payload.

20. The non-transitory, computer-readable medium of claim 19, wherein the data packet retransmission is received via an asynchronous connection-less (ACL) communication link.

21. The non-transitory, computer-readable medium of claim 19, further comprising code to:

remove, by the first device, a first maintained data packet from a first buffer when it is determined that the packet header associated with the first maintained data packet is different than one or more second maintained data packets; and maintain, by the first device, a first subsequent retransmission of the data packet in the first buffer when the first maintained data packet is removed from the first buffer.

22. The non-transitory, computer-readable medium of claim 21, further comprising code to:

remove, by the first device, a second maintained data packet from a second buffer when it is determined that the number of differences between payloads in multiple paired combinations that include the second maintained data packet meets the threshold criteria; and maintain, by the first device, a second subsequent retransmission of data packet in the second buffer when the second maintained data packet is removed from the second buffer.

23. The non-transitory, computer-readable medium of claim 22, wherein the data packet further includes a cyclic redundancy check (CRC), and wherein the error-corrected data packet includes a majority-voted CRC, the computer-readable medium further comprising code to:
  determine, by the first device, a second CRC based on the majority-voted payload of the error-corrected data packet;
  determine, by the first device, if the second CRC is valid based on a comparison of the second CRC and the majority-voted CRC;
  remove, by the first device, each of the maintained data packets from each of the different buffers when it is determined that the second CRC is valid; and
  remove, by the first device, an oldest of the maintained data packets from a respective buffer when it is determined that the second CRC is not valid.

24. The non-transitory, computer-readable medium of claim 23, wherein the data packet further includes a message integrity check (MIC), and wherein the error-corrected data packet includes a majority-voted MIC, the computer-readable medium further comprising code to:
  determine, by the first device, a second MIC based on the majority-voted payload of the error-corrected data packet;
  determine, by the first device, if the second MIC is valid based on a comparison of the second MIC and the majority-voted MIC;
  remove, by the first device, each of the maintained data packets from each of the different buffers when it is determined that the second MIC is valid; and
  remove, by the first device, the oldest of the maintained data packets from the respective buffer when it is determined that the second MIC is not valid.

* * * * *